April 15, 1924.
F. M. WALKER ET AL
1,490,872
DIRIGIBLE HEADLIGHT FOR AUTOMOBILES
Filed Feb. 24, 1923
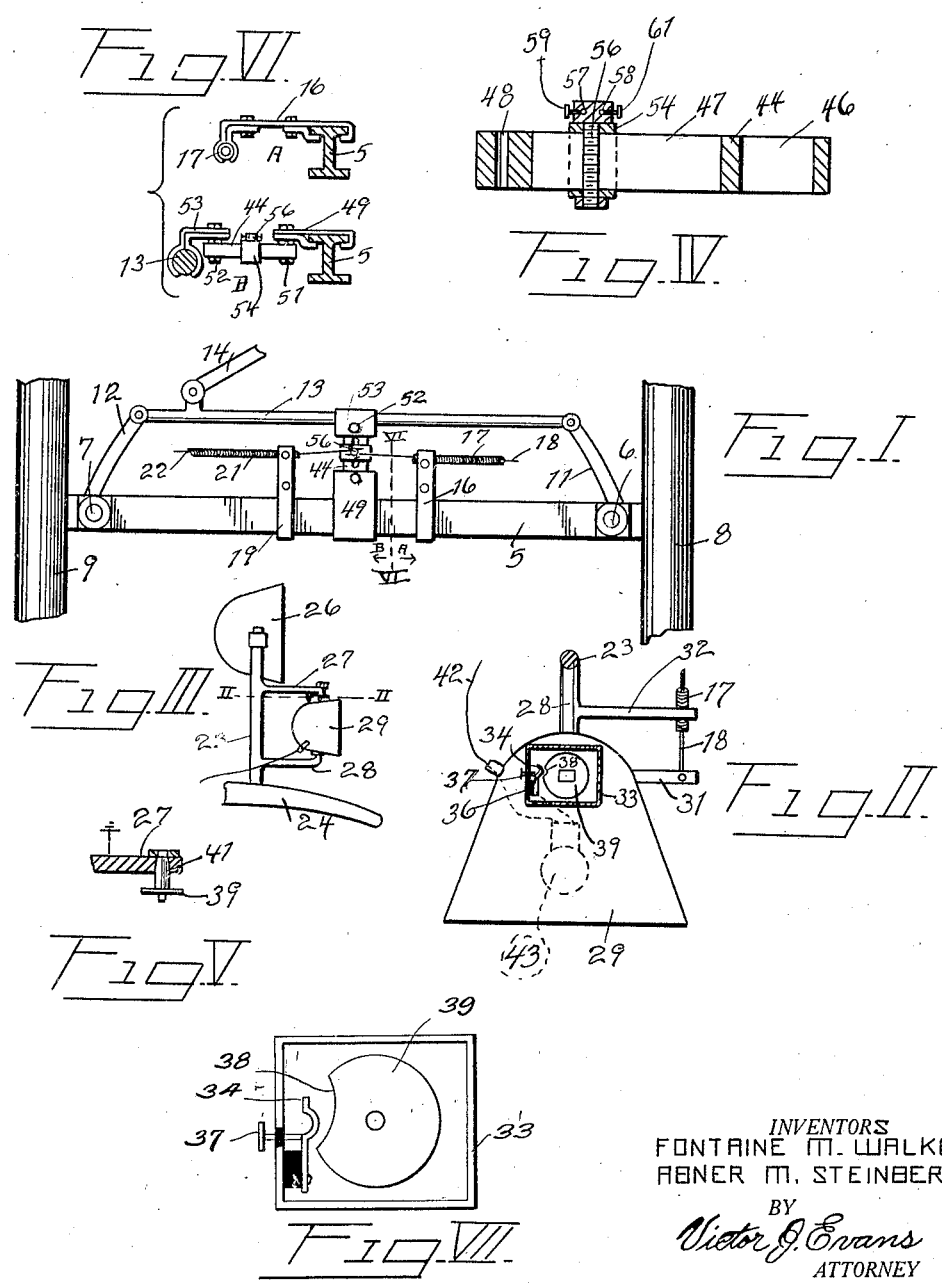
INVENTORS
FONTAINE M. WALKER
ABNER M. STEINBERG
BY
Victor J. Evans
ATTORNEY Patented Apr. 15, 1924.

1,490,872

UNITED STATES PATENT OFFICE.

FONTAINE M. WALKER, OF SAN FRANCISCO, AND ABNER M. STEINBERG, OF ROSS, CALIFORNIA.

DIRIGIBLE HEADLIGHT FOR AUTOMOBILES.

Application filed February 24, 1923. Serial No. 621,051.

*To all whom it may concern:*

Be it known that we, FONTAINE M. WALKER and ABNER M. STEINBERG, citizens of the United States, residing at San Francisco and Ross, respectively, in the counties of San Francisco and Marin, respectively and State of California, have invented new and useful Improvements in Dirigible Headlights for Automobiles, of which the following is a specification.

This invention relates to improvements in dirigible head-lights for automobiles, and has particular reference to moving an auxiliary head-light through the steering mechanism and at the same time causing the light to become illuminated, when the wheels are turned a predetermined distance to the right or to the left.

The principal object of this invention is to provide a device of this character which will be automatic in operation and one which will fully illuminate the sides of the road when the wheels of the car are turned to either side of the direction in which the car is traveling.

Another object is to provide a device of this character which is simple in construction and therefore cheap to manufacture.

Another object is to provide a device which may be attached to the steering mechanism without in any manner harming the operation of the same.

Other objects and advantages will be apparent during the course of the following description.

In the accompanying drawings forming a part of this specification, and in which like numerals are employed to designate like parts throughout the same, Figure 1 is a top plan view of the steering mechanism of an automobile having our invention applied thereto, Figure 2 is an enlarged cross section taken on the line 2—2 of Figure 3, Figure 3 is a fragmentary detail view of an automobile chassis having a head-light mounted thereon, together with our auxiliary light, Figure 4 is an enlarged detail view of the light controlling link, Figure 5 is a fragmentary detail view of one of the lamp supporting arms, showing the switch disc mounted upon the tapered pin, and Figure 6 is a plurality of cross sections taken on the line 6—6 of Figure 1, looking in the direction of the arrows A and B.

Figure 7 is an enlarged detail view of the switch mechanism.

Applicants have devised means whereby an auxiliary light is mounted adjacent the ordinary head-light which auxiliary light is moved about a vertical pivot through the medium of a Bowden wire, which wire is operated through a suitable connection with the steering mechanism. At the same time applicants have provided an electric switch which switch will throw the current to the bulb of the auxiliary lamp, in such a manner that this lamp is not illuminated as long as the machine is traveling in a straight course, but as soon as the lamp is moved to the right or left the circuit is completed and the illumination takes place.

In the accompanying drawings wherein for the purpose of illustration is shown a preferred embodiment of our invention, the numeral 5 designates the front axle of an automobile having the usual steering knuckles 6 and 7, to which the usual wheels 8 and 9 are secured.

At 11 and 12 we have shown arms extending from the steering knuckles 6 and 7 in a rearward direction and connected together as by a distance rod 13. This distance rod is connected through the ordinary link 14 to the steering worm (not shown). The structure thus far described is of ordinary construction and forms no part of this invention.

Secured to the axle 5 is a clamp 16, the construction of which is best shown in the cross section marked "A" of Figure 6. This clamp serves to hold one end of a flexible tube 17 through which a wire 18 passes. A similar clamp 19 is secured to the axle 5 and serves to hold one end of a flexible tube 21, through which a wire 22 passes. These wires 18 and 22 each extend to the right and left and to the two auxiliary lamps respectively.

By referring to Figures 2 and 3, it will be noted that a bracket 23 is mounted upon the chassis 24 and has a head-light 26 secured upon its upper extremity.

Arms 27 and 28 extend forwardly from said bracket between the extremities of which is mounted an auxiliary lamp as best shown at 29. An arm 31 is secured to the lamp 29 and extends outwardly therefrom in a plane parallel to the face of the lamp (see Fig. 2).

An arm 32 extends outwardly from the bracket 23 and is adapted to have clamped thereto the opposite end of the flexible tubing 17. The wire 18 passing through this tubing has its free end secured to the arm 31. It is of course understood that a similar arrangement is placed upon the opposite side of the vehicle, so that the free end of the wire 22 is likewise attached to an arm of the opposite lamp.

A suitable housing 33 is formed upon the top of the lamp within which is mounted a contact 34 secured to an insulating block 36. An insulated adjusting screw 37 is adapted to move the bent end of the contact 34 to or away from a notch 38 formed in a contact disc 39. This disc is mounted upon the end of a tapered pin 41 and is rigidly held in the end of the bracket arm 27. Electric current passes from a wire 42 as shown in dotted lines to a bulb 43 and from the opposite side of the bulb to the contact 34. It of course is understood that the bracket 23, to which the arm 27 is integrally formed is grounded with the result that the disc 39 will also be grounded. In order to move the wires 18 and 22 to impart movement to the lamps, I provide a link 44 which is slotted as shown at 46 and 47 and is provided with an opening as shown at 48. This link is positioned between the axle 5 and the distance rod 13, through the medium of a clamp 49 which is secured to the axle 5 and has the pivot bolt 51 extending through the slot 46. This pivot bolt is free to move in the slot 46 so that there will be no binding action. A similar pivot bolt 52 passes through the opening 48 and is attached to a clamp 53, which is secured to the distance rod 13. Slidably positioned around this link 44 is a member 54 through which a bolt 56 passes.

This bolt serves to adjustably hold the sliding member 54 in an adjusted position relative to the link 44, while the slot 47 through which this bolt passes allows for this adjustment.

The head of this bolt 56 is bored as shown at 57 and 58 so as to receive the ends of the wires 18 and 22. These ends are secured within the head of the bolt by thumb screws 59 and 61.

The operation of our device is as follows:—

Assuming that the parts have been assembled the turning of the steering wheel will cause the distance rod 13 to move either to the right or to the left. Supposing that the movement is to the right, the result will be that the clamp 53 will move toward the right causing the link 44 to pivot about its pivot points 51 and 52. As the distance between the distance rod and the axle diminishes, a sliding movement will take place between the pivot 51 and the link 44 through the medium of the slot 46. This movement of the link 44 will cause the bolt 56 to move toward the right and as the wires 18 and 22 are connected thereto, this movement will be transmitted to the auxiliary lamp 29. As these lamps rotate the contact 34, will come into contact with the disc 39 which is held stationary by the tapered pin 41 secured to the arms 27 with the result that as soon as the sliding movement has taken place current will flow from the battery of the car, through the wire 42 to the lamp 43, thence to the contact 34, disc 39 and back to the opposite side of the battery through the ground of the car.

By manipulating the adjusting screw 37, it is apparent that the contact 34 may be caused to contact the disc 39 at any predetermined time.

It is to be understood that the form of our invention herewith shown and described is to be taken as a preferred example of the same, and that various changes in the shape, size and arrangement of parts may be resorted to without departing from the spirit of the invention or the scope of the subjoined claim.

Having thus described our invention, we claim:—

In a device of the character described, an automobile steering mechanism comprising an axle, a distance rod mounted parallel with said axle, head-lights mounted at a point remote from said axle, auxiliary head-lights mounted in front and below said first mentioned head-lights, a link pivoted between said axle and said distance rod and a flexible connection from said link to each of said auxiliary head-lights for the purpose of moving said head-lights about a vertical pivot when said link is moved, a disc mounted adjacent each of said auxiliary head-lights, said disc being held stationary with respect to said last mentioned head-lights and a contact adapted to engage said disc for the purpose of completing an electric circuit through said auxiliary head-light.

In testimony whereof we affix our signatures.

FONTAINE M. WALKER.
ABNER STEINBERG.